(12) United States Patent
Pearson

(10) Patent No.: US 6,764,015 B1
(45) Date of Patent: Jul. 20, 2004

(54) MICR LINE BLOCKER-INVISIMICR

(76) Inventor: Brent A Pearson, 3289 Larue, Medford, OR (US) 97504

( * ) Notice: Subject to any disclaimer, the term of this patent is extended or adjusted under 35 U.S.C. 154(b) by 44 days.

(21) Appl. No.: 10/178,105

(22) Filed: Jun. 25, 2002

(51) Int. Cl.⁷ .............................................. G06K 11/06
(52) U.S. Cl. ..................................... 235/487; 235/494
(58) Field of Search ................................ 235/487, 494

(56) References Cited

U.S. PATENT DOCUMENTS

| | | | | |
|---|---|---|---|---|
| 3,808,404 A | * | 4/1974 | Riggs ......................... 235/488 |
| 4,004,058 A | * | 1/1977 | Buros et al. ................. 428/215 |
| 4,128,202 A | * | 12/1978 | Buros ......................... 235/493 |
| 4,667,087 A | * | 5/1987 | Quintana .................... 235/380 |
| 4,672,377 A | * | 6/1987 | Murphy et al. ............ 340/5.41 |
| 4,747,058 A | * | 5/1988 | Ho .............................. 700/225 |
| 5,016,919 A | * | 5/1991 | Rotondo ...................... 283/82 |
| 5,367,148 A | * | 11/1994 | Storch et al. ............... 235/375 |
| 5,432,506 A | * | 7/1995 | Chapman ..................... 705/44 |
| 5,456,498 A | * | 10/1995 | Greene ......................... 283/70 |
| 5,594,226 A | * | 1/1997 | Steger ......................... 235/379 |
| 5,819,236 A | * | 10/1998 | Josephson ..................... 705/35 |
| 5,832,464 A | * | 11/1998 | Houvener et al. ............. 705/45 |
| 5,903,881 A | * | 5/1999 | Schrader et al. .............. 705/42 |
| 6,073,121 A | * | 6/2000 | Ramzy ......................... 705/45 |
| 6,181,814 B1 | * | 1/2001 | Carney ....................... 382/137 |
| 6,195,452 B1 | * | 2/2001 | Royer ......................... 382/135 |
| 6,233,340 B1 | * | 5/2001 | Sandru ......................... 380/51 |
| 6,412,690 B1 | * | 7/2002 | Malki ......................... 235/380 |
| 6,549,131 B1 | * | 4/2003 | Cote et al. ............... 340/572.1 |
| 2003/0161523 A1 | * | 8/2003 | Moon et al. ................. 382/139 |

OTHER PUBLICATIONS

Adams, Russell, "Sourcebook of Automatic Identification and Data Collection" 1990, Van Nostrand Reinhold, pp. 125–133.*

* cited by examiner

Primary Examiner—Mark Tremblay

(57) ABSTRACT

Checks, drafts and negotiable instruments are modified to optically hide, block or print over the account number encoded on the standard MICR line, using non-magnetic ink. This deters casual check fraud by visually obscuring an account number on the check, while allowing the number to be magnetically read using MICR check scanners.

10 Claims, 1 Drawing Sheet

MICR LINE BLOCKER-INVISIMICR

BACKGROUND OF THE INVENTION

The field of the invention is to support the reduction of consumer and business fraud. The idea is quite simple and immediately available for check printing companies, banks, consumer and business groups. With the availability to print MICR encoded checks readily accessible through many programs, fraudulent activity is rampant. Currently, one of the most common forms of check fraud is the theft of account numbers, which can then be used to create false deposits, false negotiable instruments, and even false identification.

Thrifts, savings banks, other financial institutions, retail merchants, government agencies, and large corporations are also victims of check fraud. A recent survey of more than 2,000 large US corporations concluded that on average, they lost approximately $360,000 a year to check fraud. The FBI estimates that if commercial banks and other institutions combined their check fraud loses, the total would be $12 billion to $15 billion annually.

SUMMARY OF THE INVENTION

In order to prevent casual theft of Bank account numbers, negotiable instruments are encoded with the MICR code in the standard locations, but the account number is optically obscured using a non-magnetic black bar printed over the MICR code.

DETAILED DESCRIPTION OF THE INVENTION

Figure 1:
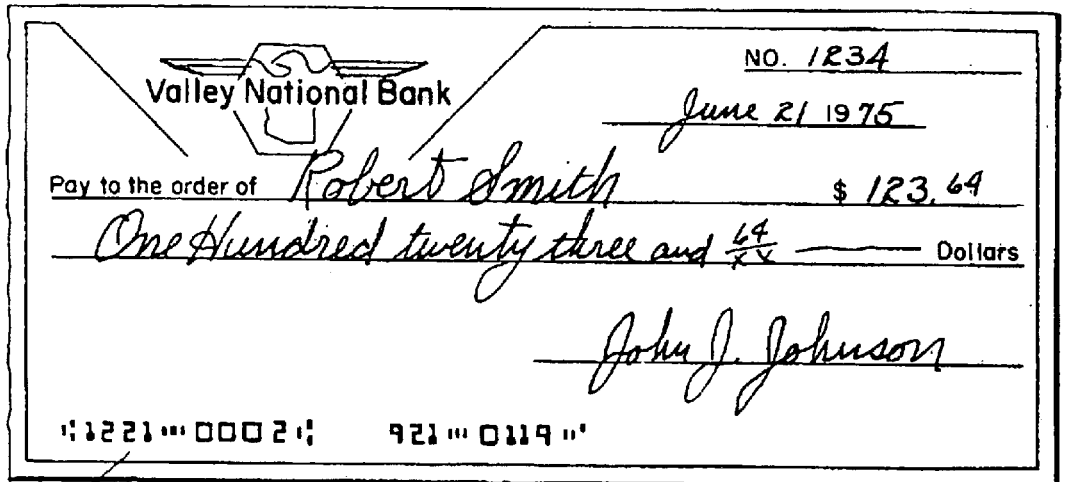
FIG. 1 depicts a conventional negotiable instrument.
Figure 2:
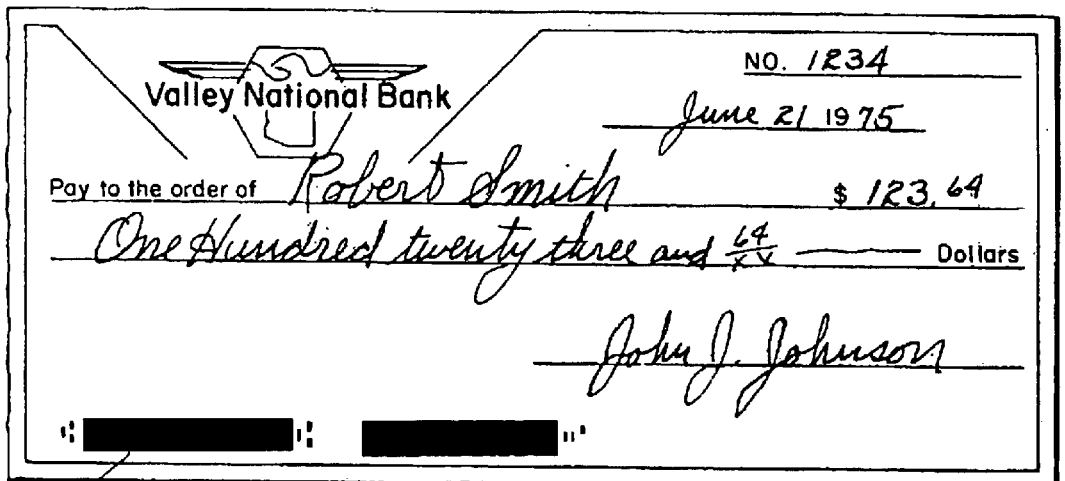
FIG. 2 depicts a negotiable instrument with a blocked MICR code.

As shown in FIG. 1, every check 1 has an MICR line 2 consisting of the account number, routing number, and typically the check number. As shown in FIG. 2, a check according to the invention has an MICR line which is blocked from visual theft by merging a black bar 3 of non-magnetic ink or other impediment with the MICR line. Sensitive account information is blocked from potential theft preventing many different forms of identity and account fraud. The MICR line blocker can opaque the whole MICR line or any combination of account number, routing number, and check number.

The MICR line blocker 3 can be printed before or after the MICR line is printed. Each method works effectively. The visual impediment of the MICR line to prevent fraud is the goal. Optionally combined with the prior art of duplicate checks (which optionally could visually show the account number to prevent account holder confusion), this tool provides a low cost, yet effective tool in keeping sensitive financial information confidential and secure.

What is claimed is:

1. A method of protecting against fraud involving negotiable instruments, comprising:

providing a negotiable instrument having a financially sensitive information encoded thereon using MICR:

marking said negotiable instrument to optically obscure said information encoded using MICR, wherein said marking leaves said information magnetically readable.

2. A method according to claim 1 wherein said negotiable instrument is a check, cashiers check or money order.

3. A method according to claim 1 wherein said information is an account number and related routing number.

4. A method according to claim 1 wherein said marking step comprises providing a non-magnetic overlay which blocks viewing of said MICR characters.

5. A negotiable instrument according to claim 1 wherein said marking step comprises ink printed over said MICR, wherein said ink is substantially the same color as said MICR.

6. A negotiable instrument comprising: a printed string of financially sensitive MICR characters; and means for optically obscuring said printed string.

7. A negotiable instrument according to claim 6 wherein said negotiable instrument is a check, cashiers check or money order.

8. A negotiable instrument according to claim 6 wherein said string is an account number and its corresponding routing number.

9. A negotiable instrument according to claim 6 wherein said means for optically obscuring comprises a non-magnetic overlay which blocks viewing of said MICR characters.

10. A negotiable instrument according to claim 6 wherein said means for optically obscuring comprises ink printed over MICR characters, wherein said ink is dominant over and roughly the same color as said MICR characters.

* * * * *